US008466954B2

(12) United States Patent
Ko et al.

(10) Patent No.: US 8,466,954 B2
(45) Date of Patent: Jun. 18, 2013

(54) SCREEN SHARING METHOD AND APPARATUS

(75) Inventors: Heinrich Shih Ko, San Francisco, CA (US); Jae Won Paik, San Mateo, CA (US); Gary Zalewski, Oakland, CA (US)

(73) Assignee: Sony Computer Entertainment Inc. (JP)

( * ) Notice: Subject to any disclaimer, the term of this patent is extended or adjusted under 35 U.S.C. 154(b) by 1396 days.

(21) Appl. No.: 11/732,830

(22) Filed: Apr. 3, 2007

(65) Prior Publication Data
US 2007/0263003 A1    Nov. 15, 2007

Related U.S. Application Data

(60) Provisional application No. 60/788,663, filed on Apr. 3, 2006.

(51) Int. Cl.
*H04N 13/04*   (2006.01)
*H04N 9/47*    (2006.01)

(52) U.S. Cl.
USPC ............................................. 348/56; 359/462

(58) Field of Classification Search
USPC ..... 348/51, 739, 564; 359/465, 462; 345/475, 345/427; 156/379.8; 349/19
See application file for complete search history.

(56) References Cited

U.S. PATENT DOCUMENTS

| 4,562,463 | A |   | 12/1985 | Lipton |
| 5,554,251 | A | * | 9/1996 | Watanabe et al. .......... 156/379.8 |
| 5,619,219 | A |   | 4/1997 | Coteus et al. |
| 5,821,989 | A |   | 10/1998 | Lazzaro et al. |
| 5,867,210 | A | * | 2/1999 | Rod ................................ 348/51 |
| 6,188,442 | B1 | * | 2/2001 | Narayanaswami ........... 348/564 |
| 6,400,394 | B1 | * | 6/2002 | Kim et al. ........................ 348/51 |
| 6,956,576 | B1 | * | 10/2005 | Deering et al. ................ 345/475 |
| 7,139,042 | B2 | * | 11/2006 | Nam et al. ...................... 349/15 |
| 2001/0043213 | A1 | * | 11/2001 | Buck et al. ..................... 345/427 |
| 2002/0105483 | A1 |   | 8/2002 | Yamazaki et al. |

(Continued)

FOREIGN PATENT DOCUMENTS

| DE | 19533767 A1 | 3/1997 |
| FR | 2 814 965 | 4/2002 |

(Continued)

OTHER PUBLICATIONS

Unreal Tournament 2004 for Windows: Product Reviews, Apr. 3, 2004.

Sungbok Lee, Alexandros Potamianos, and Shrikanth Narayanan; Acoustics of Children's Speech: Developmental Changes of Temporal and Spectral Parameters, J. Acoust. Soc. Am. 105 (3), Mar. 1999.

(Continued)

*Primary Examiner* — Dustin Nguyen
(74) *Attorney, Agent, or Firm* — Lerner, David, Littenberg, Krumholz & Mentlik, LLP

(57) ABSTRACT

Respective video feeds are provided to at least two viewers using a common display. The display is controlled to alternately display an image from a first video feed and an image from a second video feed. A first shuttered filter is synchronized to the display such that the first filter is shuttered when the second video feed image is displayed, and a second shuttered filter is synchronized to the display such that the second filter is shuttered when the first video feed image is displayed. Only the first video feed image is provided to a first viewer using the first shuttered filter, and only the second video feed image is provided to a second viewer using the second shuttered filter.

44 Claims, 13 Drawing Sheets

U.S. PATENT DOCUMENTS

| | | | |
|---|---|---|---|
| 2002/0122585 | A1 | 9/2002 | Swift et al. |
| 2002/0196332 | A1* | 12/2002 | Lipton et al. ............... 348/51 |
| 2003/0199316 | A1 | 10/2003 | Miyamoto et al. |
| 2004/0056948 | A1 | 3/2004 | Gibson |
| 2004/0109093 | A1* | 6/2004 | Small-Stryker ............ 348/739 |
| 2005/0046700 | A1 | 3/2005 | Bracke |
| 2006/0203339 | A1* | 9/2006 | Kleinberger et al. ........ 359/465 |
| 2006/0214875 | A1 | 9/2006 | Sonehara |
| 2007/0033531 | A1 | 2/2007 | Marsh |
| 2007/0263003 | A1 | 11/2007 | Ko et al. |
| 2008/0043209 | A1 | 2/2008 | Widdowson et al. |

FOREIGN PATENT DOCUMENTS

| | | |
|---|---|---|
| JP | 9-135400 A | 5/1997 |
| WO | WO-00/01456 | 1/2000 |
| WO | WO-03/003750 | 1/2003 |

OTHER PUBLICATIONS http://faculty.augie.edu/~pchanavan/speech/Chapter6.ppt; Perry C. Hanavan; Chapter 6, Vocal Mechanism.

www-ccrma.stanford.edu/~pdelac/154/m154paper.htm; Pitch Detection Methods Review (printed on Feb. 14, 2006).

Richard J. Campbell and Patrick J. Flynn; A Survey of Free-Form Object Representation and Recognition Techniques; copyright 2001.

http://sail.usc.edu/publications/LePoNa_kidsAcous_JASA1999. pdf; Kazuo Hiyane and Jun Iio, Mitsubishi Research Institute, Inc.; RWCP Sound Scene Database in Real Acoustical Environments Non-Speech Sound Recognition With Microphone Array, Copyright 1998-2001.

PCT Notification of Transmittal of the International Search Report and the Writing Opinion of the International Search Authority, or the Declaration for PCT/US 10/41343, Jul. 8, 2010, 13 pages.

\* cited by examiner

SCREEN SHARING METHOD AND APPARATUS

CROSS-REFERENCE TO RELATED APPLICATIONS

This application claims the benefit of the filing date of U.S. Provisional Patent Application No. 60/788,663 filed Apr. 3, 2006, the disclosure of which is hereby incorporated herein by reference.

BACKGROUND OF THE INVENTION

The present invention relates to systems that incorporate a display, such as are used as television or video monitors, computer monitors, or game system displays.

Presently, most displays are only able to provide one video, television program, game, etc. to all viewers of that display. As an example, all players of a given video game view the same images on the monitor, and as a result, different visual information cannot be provided to different players unless a more complex and more expensive type of display is used, such as a head mounted monitor.

Similarly, present displays that can provide more than one television program, game, or video at the same time require all viewers to view images from each of the displayed television programs, games, or videos, such as by splitting the display screen image or by providing a picture within a picture. Moreover, the audio portion of only one such television program, game, or video can be provided at a time for that audio-portion to be audible.

It is therefore desirable to provide a "screen sharing" system in which two or more viewers using the same display can each be provided with different images on the display in a manner that does not require each viewer to also view the images intended for another viewer. It is also desirable to provide system that may be configured to provide each user who is "sharing" a screen with another user the ability to receive the audio portion associated with the images or content being viewed by that user.

SUMMARY OF THE INVENTION

The present invention provides a system in which a display alternately presents images from at least two video feeds and in which a synchronized, shuttered filter device is used that only permits the viewing of images from one of the video feeds. A "video feed" may be represented as any video content, video stream, channel, game output, cable channel, video output from a consumer electronic device, DVR, DVD player, motion picture, left parallax video, right parallax video, etc. "Video feeds" may be sourced from single or multiple channels. Video feeds may be sourced through one or more physical cables or through one or more internal buses or through any known means for sourcing video images, etc.

"Screen sharing" as described herein may generally refer to a time-sharing arrangement where a single user can view 3D content or multiple users can simultaneously view programming on a single television display using the full screen dimensions and wearing shutter glasses to coordinate each user view of programming sequences.

According to an aspect of the invention, respective video feeds are provided to at least two viewers using a common display. The display is controlled to alternately display an image from a first video feed and an image from a second video feed. A first shuttered filter is synchronized to the display such that the first filter is shuttered when the second video feed image is displayed, and a second shuttered filter is synchronized to the display such that the second filter is shuttered when the first video feed image is displayed. As a result, only the first video feed image is provided to a first viewer using the first shuttered filter, and only the second video feed image is provided to a second viewer using the second shuttered filter.

The present invention can apply to solve the issue of two-player split screen game where traditional screens are divided in two portions and players sit side-by-side and play a game watching one screen with both player perspectives each occupying one half of the screen. The present invention can be configured to enable both players to see the full screen dimension of their game perspective. It also provides for less distraction as the present invention avoids the need for one player to see the other player's perspective on screen. Therefore, according to another aspect of the invention, a video game is provided to at least two players using a common display. The display is controlled to alternately display a full-screen image according to a first perspective of a video game and a full-screen image according to a second perspective of the video game. A first pair of LCD shutter glasses is synchronized to the display such that a first player using the first pair of LCD shutter glasses can play the video game while viewing the video game from the first perspective only. A second pair of LCD shutter glasses is synchronized to the display such that a second player using the second pair of LCD shutter glasses can play the video game while viewing the video game from the second perspective only.

According to a further aspect of the invention, a video game is provided to a first viewer and a video program is concurrently provided to a second viewer using the same display. The display is controlled to alternately display an image from the video game and an image from the video program. A first pair of LCD shutter glasses is synchronized to the display such that a first viewer using the first pair of LCD shutter glasses can play the video game only. A second pair of LCD shutter glasses is synchronized to the display such that a second viewer using the second pair of LCD shutter glasses can view the video program only.

The foregoing aspects, features and advantages of the present invention will be further appreciated when considered with reference to the following detailed description and accompanying drawings.

DETAILED DESCRIPTION

The present invention provides for the use of a single monitor to present respective video feeds to two or more viewers in a manner that allows each viewer to only see the images from the video feed intended for that viewer. The invention also allows each viewer to only hear the sounds associated with that video feed.

Figure 1:
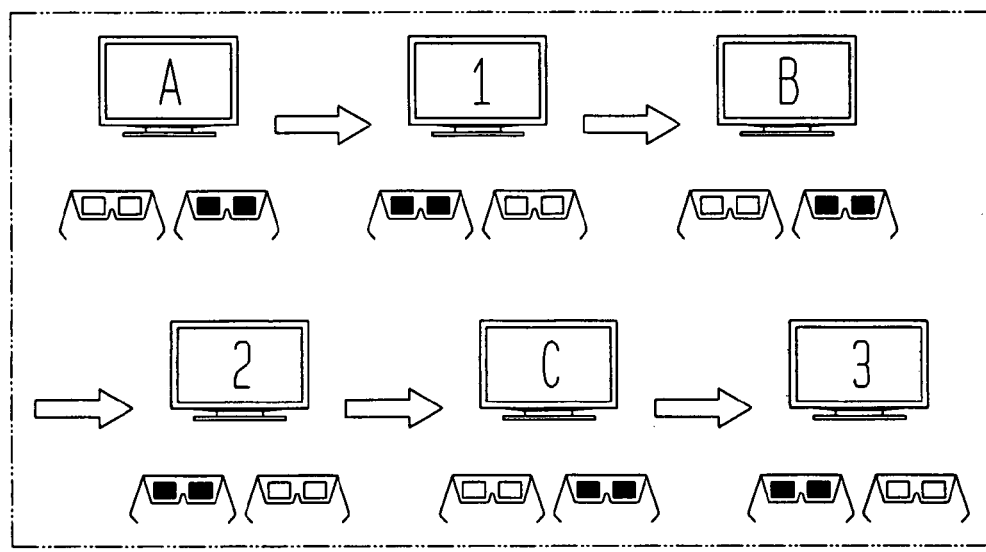
FIG. 1 is a diagram depicting an example of a display and associated pairs of LCD shutter glasses that operate in accordance with an aspect of the invention.

FIG. 1 illustrates an example of the invention in which a first video feed comprised of frames A, B, C, . . . and a second video feed comprised of frames 1, 2, 3, . . . are shown on the same monitor. The monitor alternately displays an image from each video feed, resulting in the displayed sequence of images A, 1, B, 2, C, 3, . . . shown in the upper portion of FIG. 2.

A first shuttered filter, such as the leftmost of the two pairs of LCD shutter glasses shown repeatedly in FIG. 1, is synchronized to the frames of first video feed. The first shuttered filter is open when the frames of the first video feed are shown on the monitor and is shuttered when the frames of the second video feed are shown on the monitor. An individual viewing the monitor through the first shuttered filter, e.g., by wearing the leftmost pair of LCD shutter glasses, would therefore only see the frames of the first video feed and would not see the frames of the second video feed, as shown in the leftmost bottom portion of FIG. 2.

A second shuttered filter, such as the rightmost of the two pairs of LCD shutter glasses repeatedly shown in FIG. 1, is synchronized to the frames of the second video feed. The second shuttered filter is open when the frames of the second video feed are shown on the monitor and is shuttered when the frames of the first video feed are shown on the monitor. Thus, an individual viewing the monitor through the second shuttered filter, e.g., by wearing the rightmost pair of LCD shutter glasses, would therefore only see the frames of the second video feed and would not see the frames of the first video feed, as shown in the rightmost bottom portion of FIG. 2.

The lenses of a pair of LCD shutter glasses are preferably either both open or both shuttered at the same time and are synchronized to the images from one of the displayed video feeds to allow the wearer to view the images from that video feed.

Each viewer may also be provided with a speaker that emits only the audio signals for the video feed provided to that viewer. A first audio signal associated with the first video feed is provided to the viewer of the first video feed, and a second audio signal associated with the second video feed is provided to the viewer of the second video feed. As an example, each pair of the LCD shutter glasses shown in FIGS. 1 and 2 may be provided with a headphone or earphone that permits the wearer to hear the sounds for the video feed being viewed by the wearer without interference from the sounds provided to a viewer of another video feed.

Figure 5:
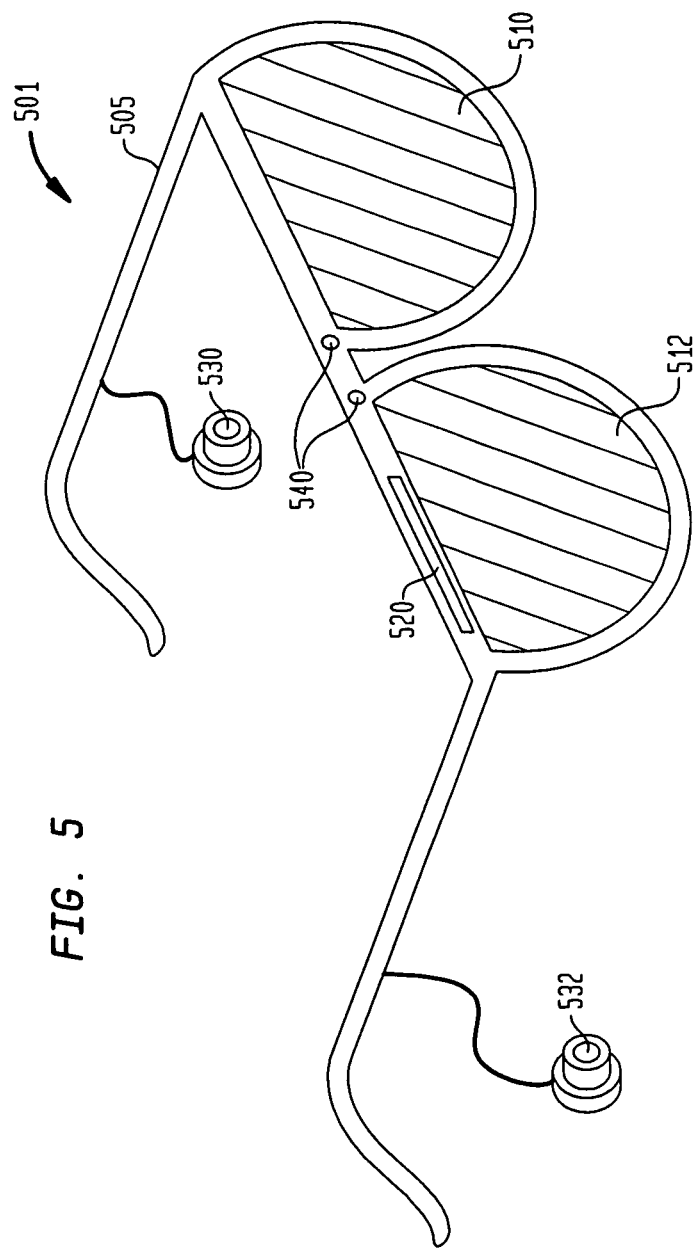
FIG. 5 is an isometric view of glasses and headphones in accordance with an aspect of the invention.

Glasses 501 in accordance with an aspect of the present invention are shown in FIG. 5. The glasses may include a frame 505 for holding a left LCD eyeglass lens 510 and a right LCD eyeglass lens 512. As noted above, each eyeglass lens 510 and 512 can be rapidly and selectively blackened so as to prevent the wearer from seeing through the lens. Left and right earphones 530 and 532 are also preferably connected to the frame 505. An antenna 520 for sending and receiving wireless information may also be included in or on the frame 505. The glasses may be tracked via any means to determine if the glasses are looking toward the screen. For example, the front of the glasses may also include one or more photo detectors 540 for detecting the orientation of the glasses towards the monitor.

The alternating displays of images from the video feed can be provided using various known techniques. It is preferred that screen 410 be configured to operate in a progressive scan mode for each video feed that is shared on the screen. However the present invention may also be configured to work with interlaced video, as described. For a standard television monitor, such as those using an interlaced NTSC or PAL format, the images of the two video feeds may be interlaced and the lines of an image from one video feed may be interleaved with the lines of an image from the other video feed. For example, the odd-numbered lines taken from an image from the first video feed are displayed, and then the even-numbered lines taken from an image from the second video feed are displayed.

For applications in which the images of one or more of the video feeds are to provide the appearance of continuous motion, the frequency at which the images of both video feeds are shown on the monitor must be greater than that which the human eye can perceive. Thus, the images from video feeds presented using interlacing/interleaving may be prone to flickering or poor resolution. As an alternative, the images from the two video feeds may be alternately presented on the monitor by flipping between two pages of video memory that store the two images, known as page flipping. Also, a progressive scanning monitor may be used in combination with page flipping.

Figure 6:
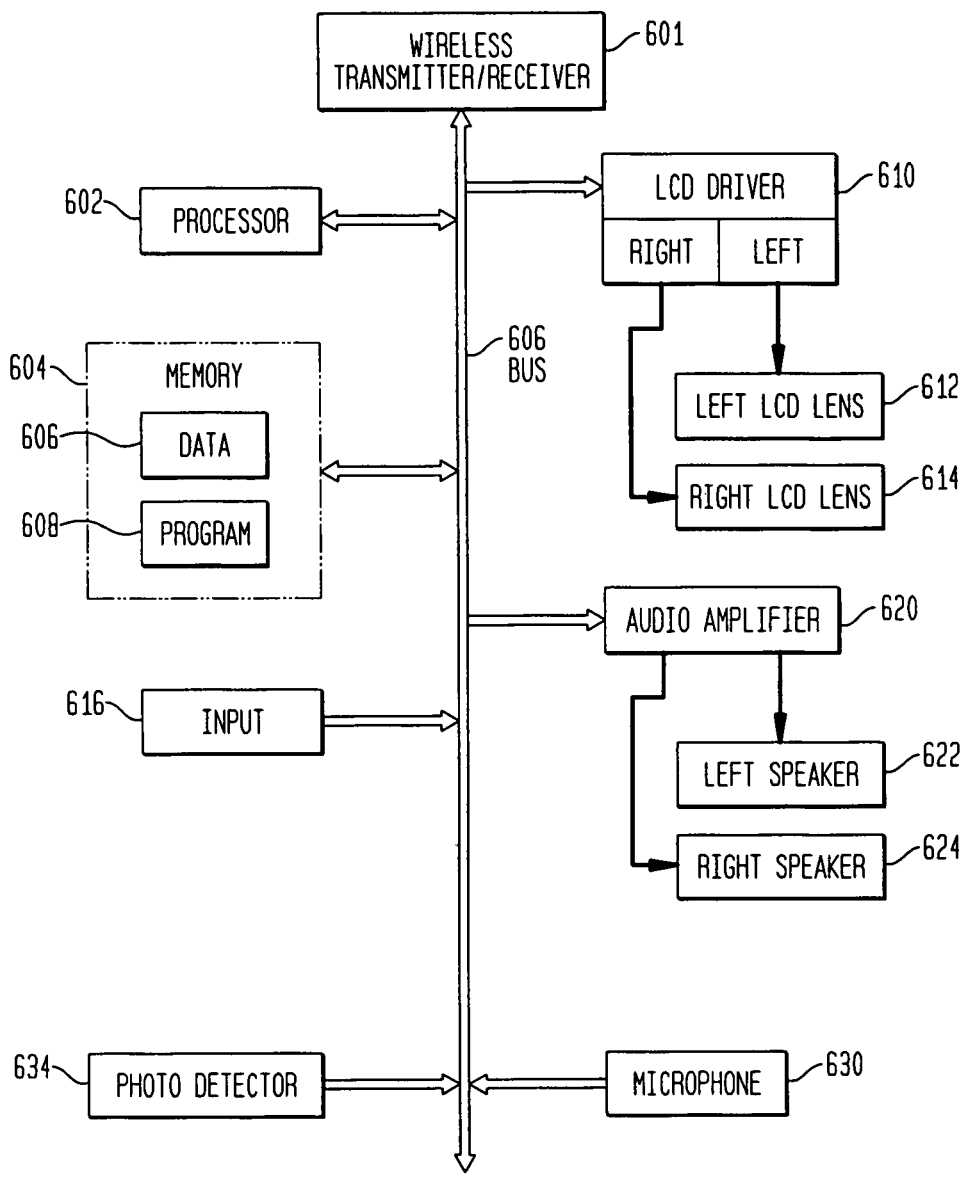
FIG. 6 is a system diagram of glasses in accordance with an aspect of the invention.

A system diagram of glasses in accordance with an aspect of the invention is shown in FIG. 6. The glasses may include a processor 602 which executes instructions from program 608 stored in memory 604. Memory 604 may also store data to be provided to, or output from, processor 602 as well as any other storage retrieval/storage element of the glasses. Processor 602, memory 604 and the other elements of the glasses may communicate with one another over a bus 606. Such other elements may include an LCD Driver 610 which provides a driver signal which selectively shutters left and right LCD lens 612 and 614. The LCD Driver may shutter each left and right LCD lens individually and at different times and durations, or together at the same time and duration.

The frequency at which the LCD lens are shuttered may be stored in advance in the glasses (e.g., based on the known frequencies of NTSC). Alternatively, the frequency may be selected via means of user input 616 (e.g., knobs or buttons to adjust or enter the desired frequency). Yet further, the desired frequency as well as the initial shutter start time, or other information indicating the time period during which the LCD lenses should be shuttered or not regardless of whether such time periods are at a set frequency and duration, may be transmitted to the glasses via wireless transmitter receiver 601 or any other input element. The wireless transmitter/receiver 601 may comprise any wireless transmitter, including a Bluetooth transmitter/receiver.

Audio amplifier 616 may also receive information from the wireless transmitter/receiver 601, namely, the left and right channels of audio to be provided to left speaker 622 or right speaker 624. The glasses may also include a microphone 630. The microphone 630 may be used in connection with games providing for voice communication; the voice signals may be transmitted to a game console or another device via wireless transmitter/receiver 601.

The glasses may also include one or more photo detectors 634. The photo detectors may be used to determine whether the glasses are oriented towards the monitor. For example, the photo detectors may detect the intensity of light hitting the photo detectors and transmit the information to to processor 602. If the processor detects a substantial drop in light intensity, which may relate to the user looking away from the monitor, the processor may cease the shuttering of the lenses. Other methods of determining whether the glasses (and thus user) are oriented towards the monitor may also be used. For example, one or more cameras in lieu of photo detectors may be used and the captured images examined by processor 602 to determine whether the glasses are oriented towards the monitor. Just a few possible embodiments of using such a camera may include checking contrast levels to detect whether the camera is pointed at the monitor or attempting to detect brightness test patterns on the monitor. The device providing multiple feeds to the monitor may indicate the presence of such test patterns by transmitting information to processor 602 via wireless transmitter/receiver 601.

Figure 7:
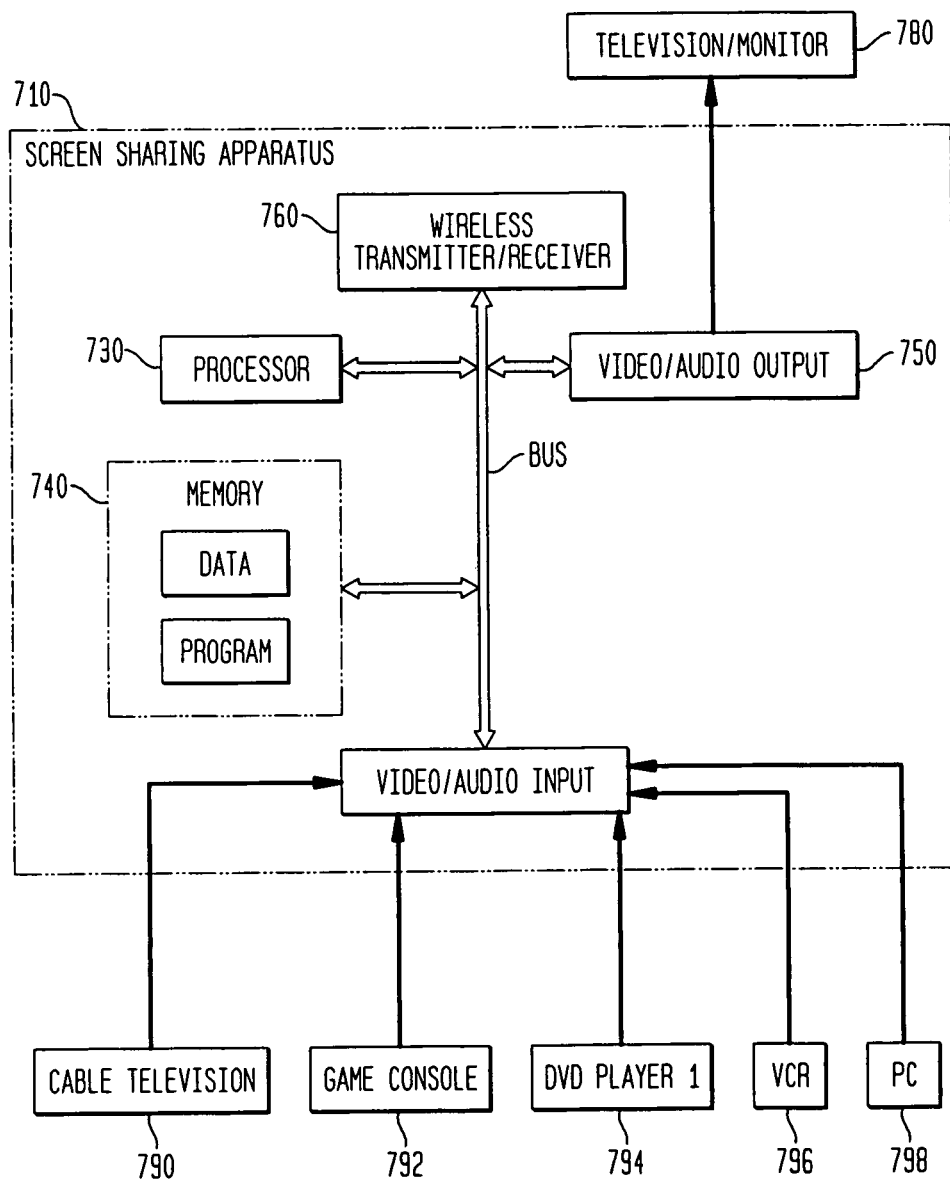
FIG. 7 is a system diagram of a screen sharing apparatus, in communication with a television or monitor and multiple inputs, in accordance with an aspect of the invention.

A system diagram of one aspect of a screen sharing apparatus 710 which provides the video to be displayed is illustrated in FIG. 7. A video/audio input 720 accepts two or more video and audio inputs such as but not limited to, and preferably in any combination, from: a cable television set top box 790, game console 792, DVD player 794, VCR 796 and a personal computer 798. Though it should be recognized for the purposes of this invention that a single video stream may represent two "video feeds" or video inputs. The single video stream can be a time division multiplexed sequence of video frames characterized by two or more video feeds or inputs. Also, the video inputs do not need to be sourced from multiple devices. Rather, one device may be capable of presenting two or more video inputs or video feeds.

With respect to the continuing example, A processor 730 retrieves and stores data in memory 740 and provides signals to the other elements of the screen sharing apparatus. Video/audio output 750 multiplexes a selected number of the video signals from the video inputs in a manner such that two or more of the video signals follow one another sequentially in rapid succession on a single video output signal to the television or monitor 780 (it being understood that such single video output signal may actually comprise multiple signals, including composite or color signals). Information related to the multiplexed signals may be transmitted via wireless transmitter/receiver 760 to the glasses. Such information may include the number of video inputs selected for multiplexing, the frequency of the multiplexing, the time at which a particular video signal is sent to television or monitor 780, an identifier of which video signal is being displayed at a particular time, and other information. The audio signal from the audio/video inputs 790-798 may also be transmitted wirelessly from the screen sharing apparatus 710 to the glasses.

Figure 8A:
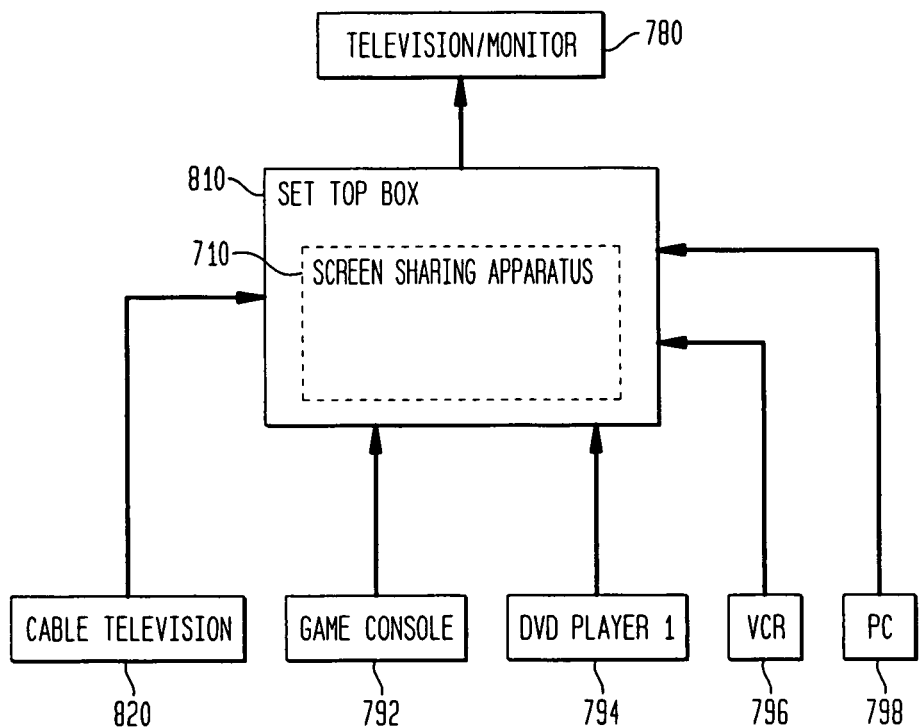
FIGS. 8A and 8B are system diagrams of a screen sharing apparatus contained in a set top box and game console, respectively.
Figure 8B:
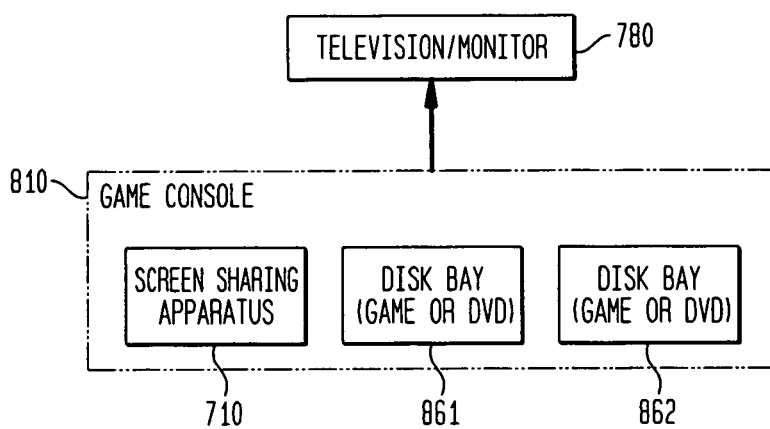

Although the screen sharing apparatus 710 is schematically illustrated as being separate from the television 780 and video inputs in FIG. 7, the apparatus may be located in a wide variety of devices. For example and as illustrated in FIG. 8A, the screen sharing apparatus 710 may be embedded in a set top box having multiple inputs. As shown in FIG. 8B, the screen sharing apparatus may also be contained in a game console having multiple internal audio/video sources, such as two disk bays 861, 862 (each capable of rendering content from a game or DVD).

Figure 2:
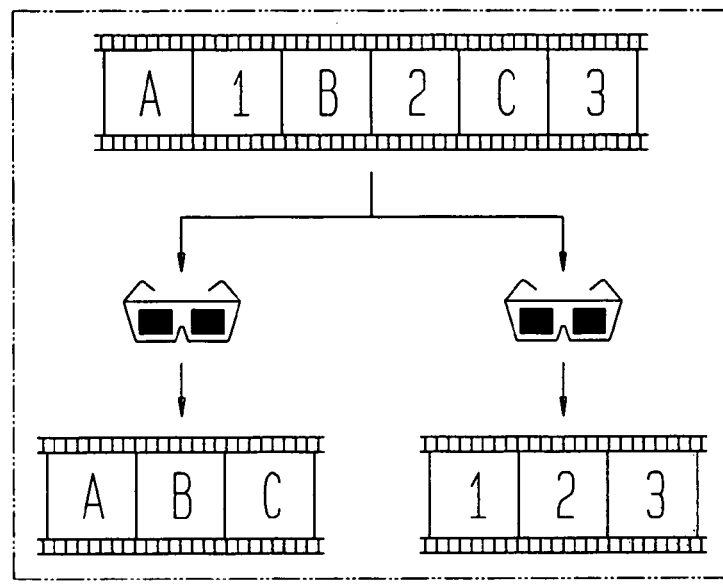
FIG. 2 is a diagram showing the sequence of frames presented by the display of FIG. 1 and showing the frames viewed by each wearer of a given pair of the LCD shutter glasses in accordance with an aspect of the invention.

Though only two video feeds and two shuttered filters are shown in FIGS. 1 and 2, the invention is also applicable to arrangements in which the monitor shows more than two video feeds and in which more than two synchronized, shuttered filters are used to allow viewing of each of the video feeds.

Figure 3A:
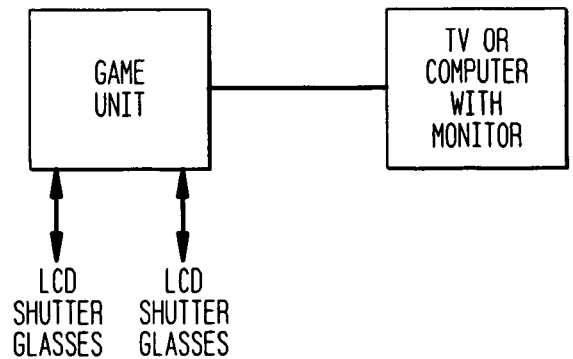
FIGS. 3A-3C are diagrams illustrating various embodiments of a system in accordance with an aspect of the invention.

FIG. 3A illustrate an embodiment of the invention used in a video game system. A game unit stores the software required for playing the video game and also controls the images delivered to the monitor of a television set or computer. The game unit provides two video feeds to the monitor and controls the monitor to alternately display images from the two video feeds, as described above with regards to FIGS. 1 and 2. The game unit is also connected to two or more pairs of LCD shutter glasses and synchronizes the shutter operation of each given pair of LCD shutter glasses to one of the video feeds. The connection between the game unit and the pairs of LCD shutter glasses may be a physical connection or may be a wireless connection, such as using the Bluetooth communication protocol.

Figure 9:
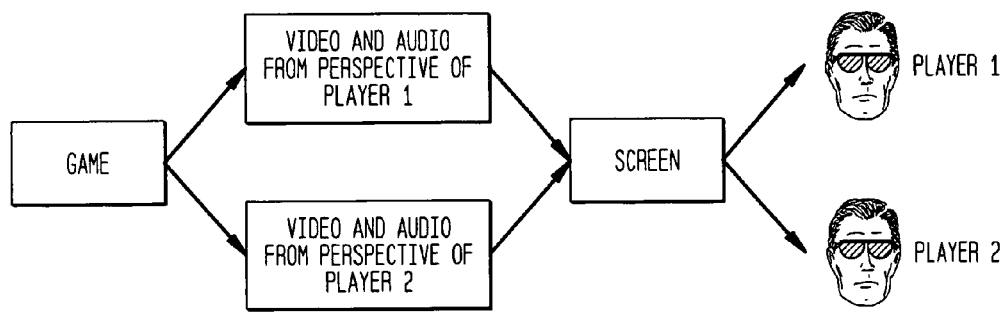
FIG. 9 is a functional diagram of audio/video content being simultaneously provided to multiple users in accordance with an aspect of the invention.

The embodiment shown in FIG. 3A, and FIG. 9, thus allows each player of a video game to participate in the game from that player's perspective. One of the video feeds provides a first player with a particular view of the activities of the game and may include visual information not provided to the other player. In a similar manner, the other video feed provides a second player with a different view of the same game that is suited to that player. Each player wears a pair of LCD shutter glasses that is synchronized to the images of one of the video feeds and only allows the player to view images of that video feed. Also, if headphones are provided for each player, the first and second players may each be provided with sounds and/or audio instructions not provided to the other player.

Figure 10:
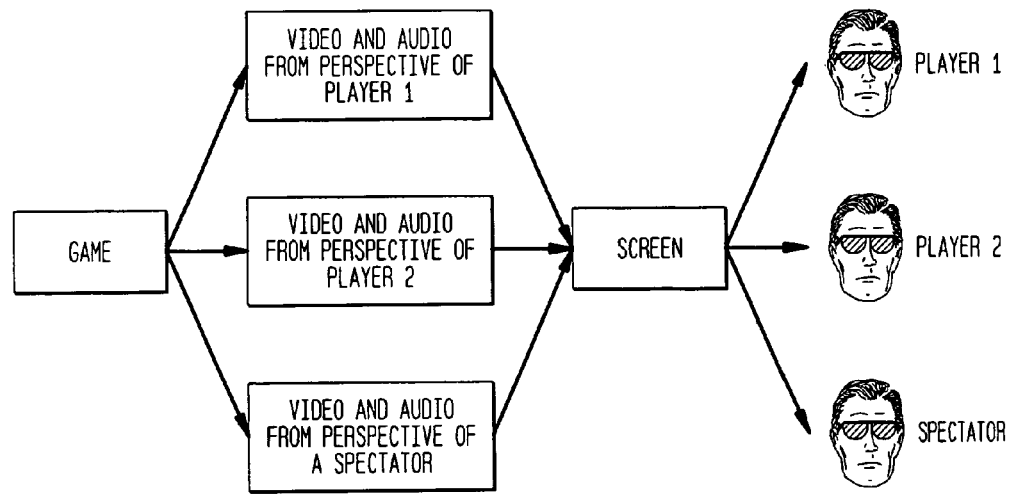
FIG. 10 is a functional diagram of audio/video content being simultaneously provided to multiple users in accordance with an aspect of the invention.

As a variation of this example and shown in FIG. 10, a third pair of LCD shutter glasses is added and is controlled by the game unit to provide the wearer with a spectator mode of the video game in which both views of the game may be seen. The third pair of LCD shutter glasses, for example, may provide one of the pair of shutter glasses with one of the video feeds and provide the other of the pair of shutter glasses with another of the video feeds in manner similar to that used in a 3D application, resulting in a combined view of the images from two video feeds.

Figure 12:
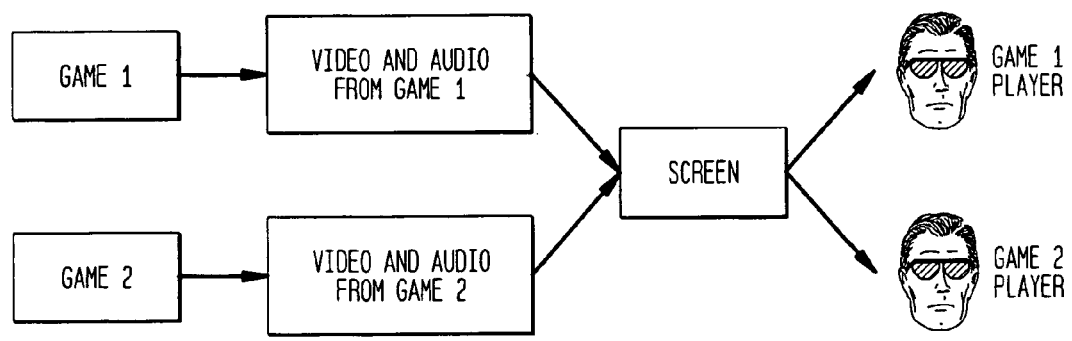
FIG. 12 is a functional diagram of different game content being provided to multiple users in accordance with an aspect of the invention.

As another example, and as illustrated in FIG. 12, the two video feeds may provide images of two respective video games. The game unit controls the monitor to alternately provide images from each perspective of the two video games and synchronizes the two pairs of LCD shutter glasses such that a particular pair of the LCD shutter glasses only provides a view of one of the video games. Using this arrangement, the two video games may be played concurrently by different players using the same game unit and monitor.

Figure 3B:
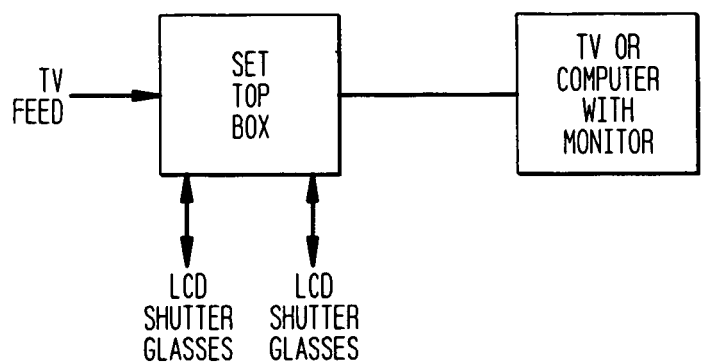
Figure 13:
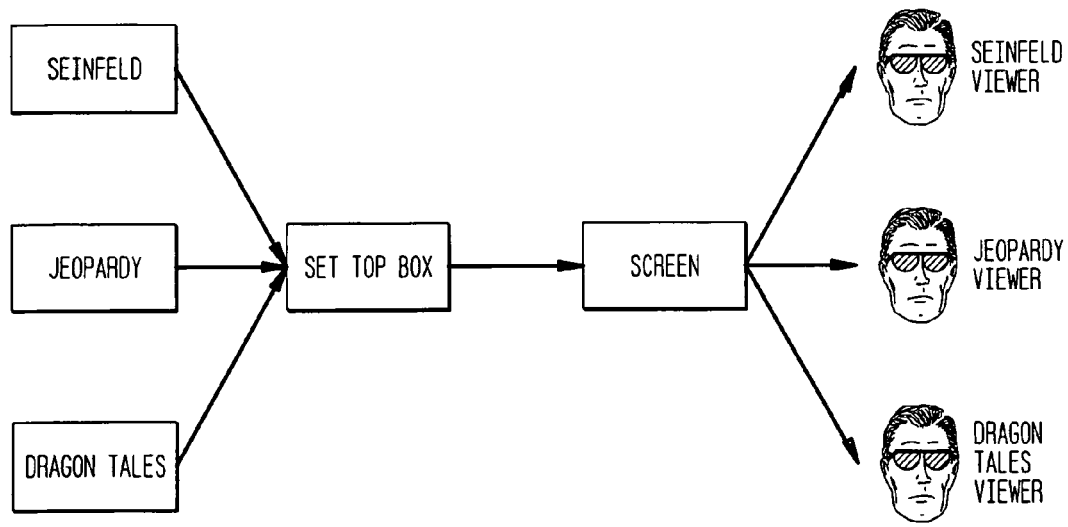
FIG. 13 is a functional diagram of different television channels being provided to multiple users in accordance with an aspect of the invention.

FIG. 3B and FIG. 13 show another embodiment of the invention in which a set top box receives various television channels (such as three channels showing the shows Seinfeld, Jeopardy and Dragon Tales, respectively) and/or videos and controls the monitor to alternately display images from each television programs and/or video. The set top box controls each of the LCD shutter glasses to allow its wearer to view only one of the programs and/or videos. The inclusion of headphones also allows each viewer to hear the audio portion of only the program or video being viewed. Using this arrangement, two or more individuals can watch and hear different television programs and/or videos at the same time and while in the same room and viewing the same monitor.

The invention may be used with any number of video feeds. For example, the set top box shown in FIG. 3B may be configured to receive four or more video feeds that are cyclically displayed on the monitor, and each of the video feeds is associated with one of four different pairs of LCD shutter glasses controlled by the set top box and synchronized to the display of its associated video feed.

Figure 3C:
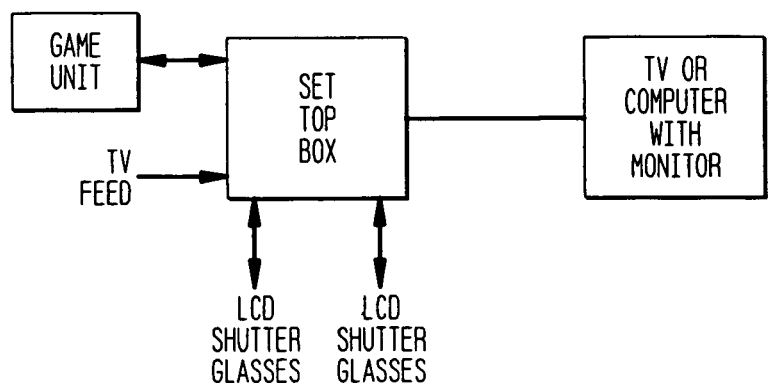
Figure 14:
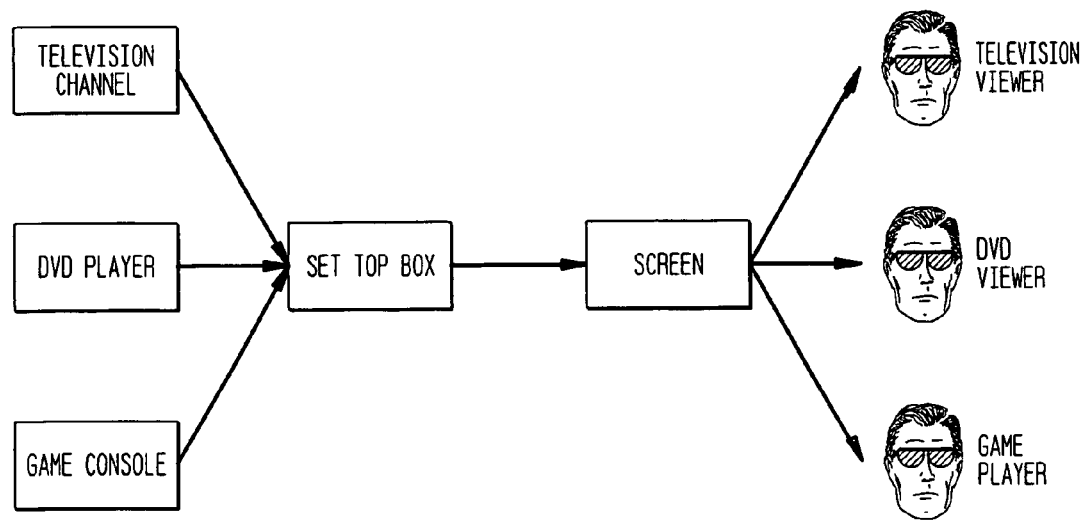
FIG. 14 is a functional diagram of different audio/visual content being provided to multiple users in accordance with an aspect of the invention.

FIG. 3C and FIG. 14 show a further embodiment of the invention in which a set top box receives various television channels and/or videos and is also connected to a game unit from which it receives a video game feed. The set top box controls the monitor to alternately display images from the video game and images from the television program or video. The control unit also synchronizes the shuttering of one of the pairs of LCD shutter glasses to permit its wearer to view the television program or video and synchronizes the shuttering of the other pair of LCD shutter glasses to permit its wearer to concurrently play the video game. Using this arrangement, an individual can watch and hear a television program or a video at the same time that another individual plays a video game with both individuals viewing the same monitor.

Figure 15:
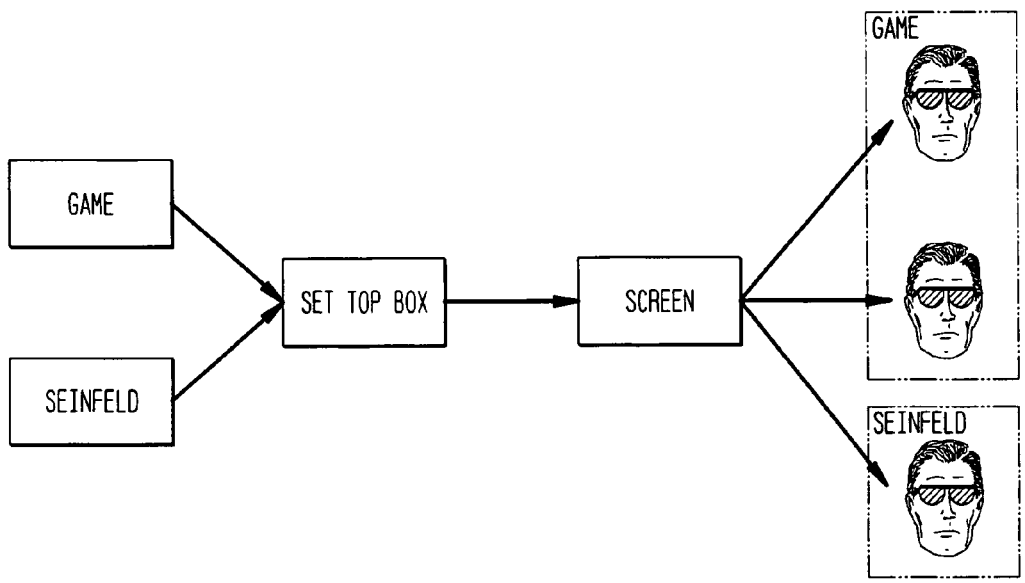
FIG. 15 is a functional diagram of game and television audio/visual content being provided to multiple users in accordance with an aspect of the invention.

In an alternative arrangement, and as shown in FIG. 15, the embodiment shown in FIG. 3C may include a third pair of LCD shutter glasses to permit two individuals to play the video game while, at the same time, a third person watches a television program or video on the same monitor. The two players of the video game may view the video game from the same perspective, in which case the set top box controls the monitor to alternately display the images from the video game and the images from the television program or video. The set top box synchronizes the shuttering of the two pairs of LCD shutter glasses worn by the video game players to the intervals during which the video game is displayed so that the two players view only the video game.

Figure 16:
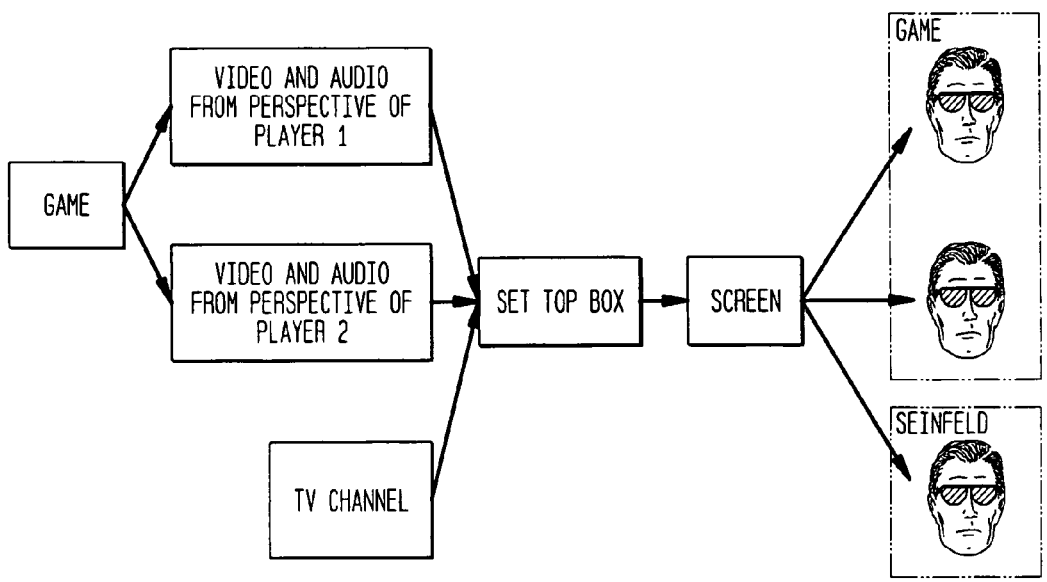
FIG. 16 is a functional diagram of game and television audio/visual content being provided to multiple users in accordance with an aspect of the invention.

As a further alternative as shown in FIG. 16 using the embodiment shown in FIG. 3C, each of the two video game players uses the monitor to view the video game from a different perspective than the other, and the third individual watches and hears the television program or video at the same time also using that monitor. The set top box controls the monitor to cyclically display, e.g., an image from the video game at a first perspective, an image from the video game at a second perspective, and an image from the television program or video. The set top box thus synchronizes the shuttering of the pairs of LCD shutter glasses to the images displayed on the monitor such that a wearer of one of the pairs of LCD shutter glasses plays the video game viewed from the first perspective, a wearer of another of the pairs of LCD shutter glasses plays the video game viewed from the second perspective, and a wearer of the third pair of LCD shutter glasses views the television program or video.

Figure 11:
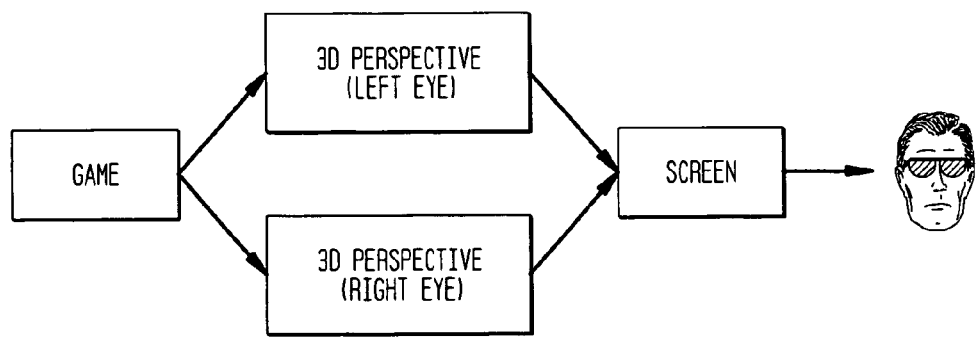
FIG. 11 is a functional diagram of 3-D content being provided to a user in accordance with an aspect of the invention.
Figure 17:
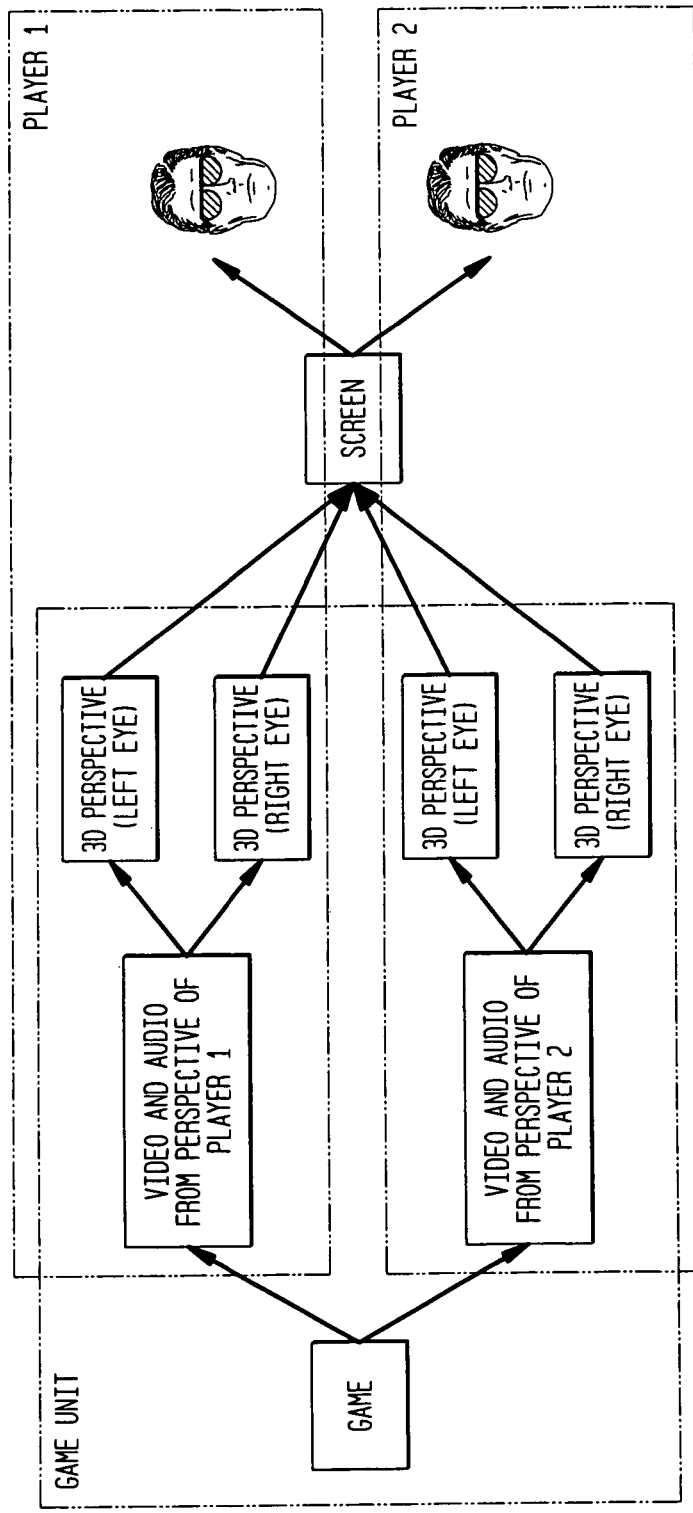
FIG. 17 is a functional diagram of game content, from the same game, being provided to users in 3-D and from perspectives particular to each user, in accordance with an aspect of the invention.

As shown in FIG. 11, the present invention may also provide one or more players of a video game to play the game with in three-dimensions (3D) view and/or permit one or more viewers to view the television program and/or video in 3D. As shown in FIG. 17, each player of a video game may view the game in 3D in addition to ach viewing the game from a different perspective that the other players. Using the arrangement shown in FIG. 3A, for example, the game unit may control the monitor to cyclically show, e.g., a left image frame at a first perspective, a right image frame at the first perspective, a left image frame at a second perspective, and a right image frame at the second perspective. To attain the 3D effect, the left and right shutters of each pair of LCD shutter glasses are synchronized to different displayed images. Thus, the left shutter of one of the pairs of LCD shutter glasses is synchronized to view the left image frame at the first perspective, and the right shutter of that pair of LCD shutter glasses is synchronized to view the right image frame at the first perspective. Similarly, the left shutter of another of the pairs of LCD shutter glasses is synchronized to view the left image frame at the second perspective, and the right shutter of that pair of LCD shutter glasses is synchronized to view the right image frame at the second perspective. As a result, each player of a video game views the game in 3D as well as from his or her particular perspective.

Figure 18:
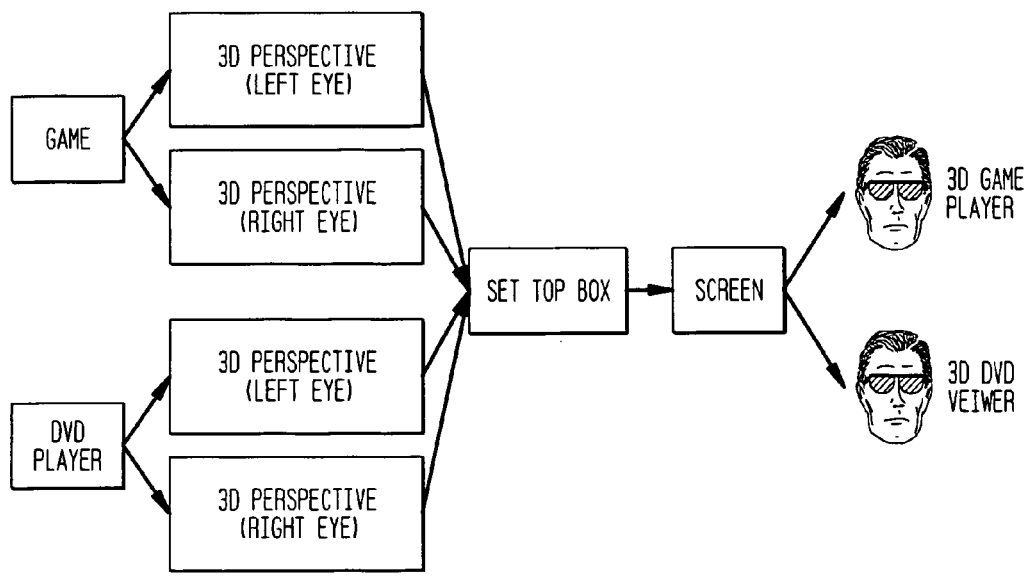
FIG. 18 is a functional diagram of game content being provided to a user in 3-D, and a movie (or other audio/visual content) being provided to a different user in 3-D, in accordance with an aspect of the invention.

As another example, two viewers may watch different television programs and/or videos in 3D at the same time and while viewing the same monitor, such as using the arrangement shown in FIG. 3B, or one may watch a television program or video in 3D while another plays a video game viewed in 3D from the same monitor, such as using the arrangement shown in FIG. 3C. The monitor is controlled to cyclically display, e.g., a left image frame from a television program or video, a right image frame from the television program or video, a left image frame from another television program or video or from a video game feed, and a right image frame from the another television program or video or from the video game feed. The left and right lens of each pair of LCD shutter glasses is thus synchronized such that each wearer views his or her respective television program, video, or video game in 3D. FIG. 18 schematically illustrates one viewer playing a 3D game and another viewer watching a 3D movie on the same screen.

Figure 19:
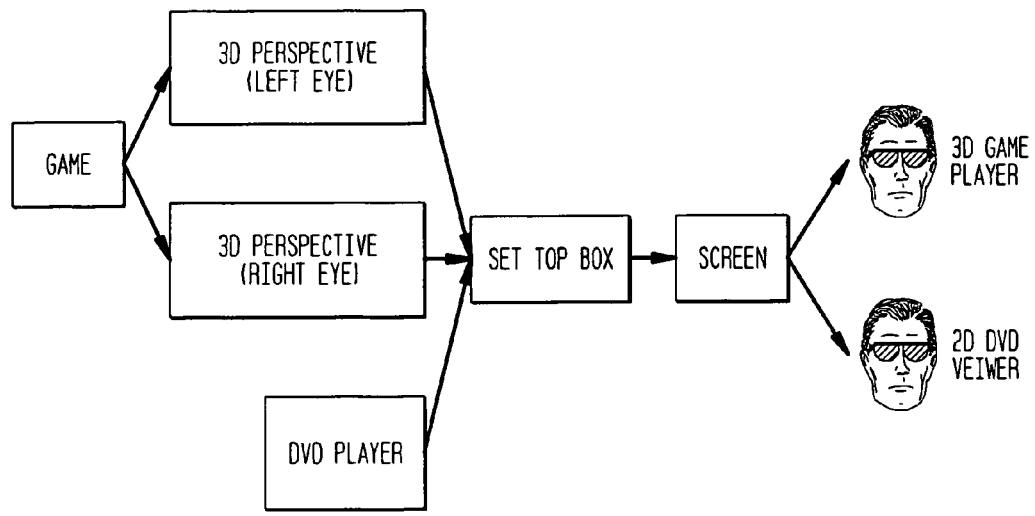
FIG. 19 is a functional diagram of game content being provided to a user in 3-D, and a movie (or other audio/visual content) being provided to a different user in 2-D, in accordance with an aspect of the invention.

In a further example, one or more individuals may play a video game in 3D and another individual may watch two-dimensional (2D) images of a television program and/or video at the same time and while viewing the same monitor, such as using the arrangement shown in FIG. 3C. FIG. 19 also schematically illustrates such an arrangement. The monitor is controlled to cyclically display a left image frame from the video game feed, a right image frame from the video game feed, and a frame from the television program or video. The left lens of one pair of LCD shutter glasses is synchronized to the timing of the left image frame from the video game feed and the right lens of the pair of LCD shutter glasses is synchronized to the timing of the right image frame from the video game feed so that the wearer views the video game in 3D. The left and right lenses of another pair of LCD shutter glasses are both synchronized to the timing of the frame from the television program or video and thus allow the wearer to view the 2D television program or video from the same monitor used to play the video game.

Figure 4:
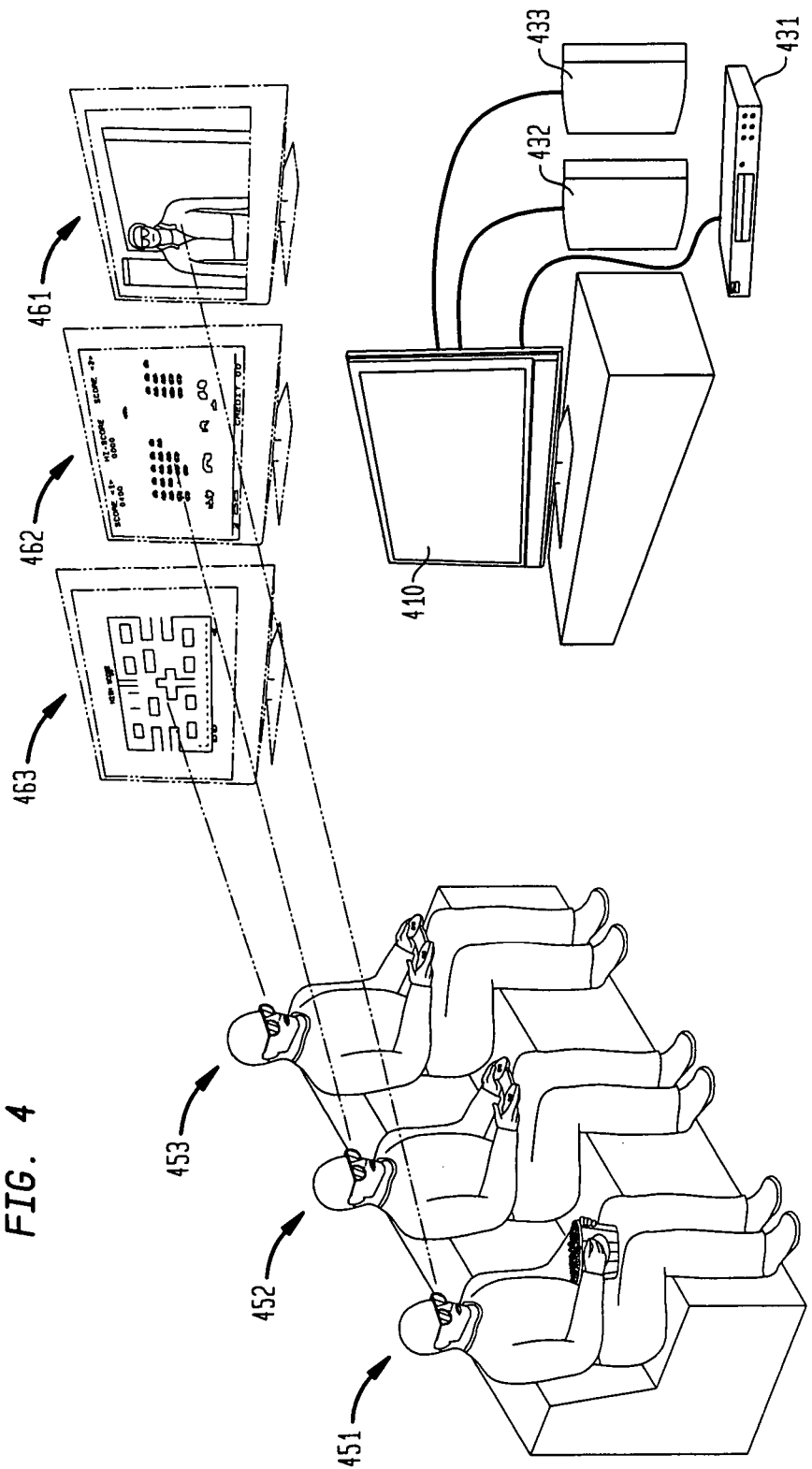
FIG. 4 is representational drawing of people watching different audio/video content on the same screen in accordance with an aspect of the invention.

FIG. 4 illustrates three people watching three different video entertainment programs. In one aspect of the invention, three people 451-452 are each wearing glasses, with headphones, in accordance with the present invention and watching the same television 410. Bravia® television 410 includes a screen sharing apparatus described above, and accepts three different video inputs, namely, two Sony Playstation game consoles 432, 433 and a DVD player 431. The television multiplexes the three different audio/video inputs together as described, and wireless transmits information regarding which visual input is being displayed at any particular time to the glasses. The first person's (451) glasses are shuttered such that he or she can only see through the glasses when the Terminator movie 461 (playing on DVD player 431) is being shown on the screen of television 410. The second person's (452) glasses are shuttered such that he or she can only see through the glasses when the MotorStorm game 462 (playing on Playstation console 432) is being shown on the same television 410. The third person's (453) glasses are shuttered such that he or she can only see through the glasses when the PacMan game 463 (playing on Playstation console 433) is being shown on the same screen. The audio corresponding with DVD player 431, and game consoles 432, 433 is also wireless transmitted to the glasses of persons 451, 452 and 453, respectively. In this manner, each person 451-453 can use a single television to listen and watch three different audio/video sources.

In addition to the above examples, the invention also enables the use of a common monitor to provide other combinations of video games, television programs, and videos together with other combinations of 2D or 3D presentations and/or different perspectives.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An apparatus for providing respective video feeds to at least two viewers using a common display and being connectable to the common display, a first shuttered filter, and a second shuttered filter, said apparatus comprising:
    a control unit operable to control the common display to:
        alternately display an image from a first video feed and an image from a second video feed,
        synchronize the first shuttered filter to the common display such that the first filter is shuttered when the second video feed image is displayed, and
        synchronize the second shuttered filter to the common display such that the second filter is shuttered when the first video feed image is displayed, thereby providing only the first video feed image to a first viewer using the first shuttered filter and providing only the second video feed image to a second viewer using the second shuttered filter, wherein:
            the first shuttered filter is shuttered when the first shuttered filter is in a first orientation, and the first shuttered filter is not shuttered when the first shuttered filtered is in a second orientation, the first orientation being where the first shuttered filter is oriented towards the common display and the second orientation being where the first shuttered filter is oriented away from the common display; and
            the second shuttered filter is shuttered when the second shuttered filter is in a third orientation, and the second shuttered filter is not shuttered when the second shuttered filtered is in a fourth orientation, the third orientation being where the second shuttered filter is oriented towards the common display and the fourth orientation being where the second shuttered filter is oriented away from the common display.

2. An apparatus according to claim 1, wherein said control unit is further operable to control a first audio unit coupled to the first shuttered filter to provide sounds associated with the first video feed to the first viewer and to control a second audio unit coupled to the second shuttered filter to provide sounds associated with the second video feed to the second viewer.

3. An apparatus according to claim 1, wherein said control unit is operable to alternately display the first video feed image and the second video feed image by interlacing the first video feed image with the second video feed image, whereby lines of the first video feed image are interleaved with lines of the second video feed image.

4. An apparatus according to claim 1, wherein the first video feed is a first television signal and the second video feed is a second television signal, whereby the first viewer is provided with programming carried by the first television signal and the second viewer is provided with programming carried by the second television signal.

5. An apparatus according to claim 1, wherein the first video feed is a first video game signal and the second video feed is a second video game signal, whereby the first viewer is provided with a first video game and the second viewer is provided with a second video game.

6. An apparatus according to claim 1, wherein the first video feed is a signal providing the first viewer with a first player's perspective of a video game and the second video feed is a signal providing the second viewer with a second player's perspective of the video game.

7. An apparatus according to claim 1, wherein the first video feed is a television signal and the second video feed is a video game signal, whereby the first viewer is provided with programming carried by the television signal and the second viewer is provided with a video game.

8. A system for providing respective video feeds to at least two viewers, said system comprising:
    a control unit;
    a display connected to said control unit;
    a first shuttered filter connected to said control unit; and
    a second shuttered filter connected to said control unit;
    said control unit being operable to control said display to alternately display an image from a first video feed and an image from a second video feed, to synchronize said first shuttered filter to said display such that said first shuttered filter is shuttered when the second video feed image is displayed, and to synchronize said second shuttered filter to said display such that said second shuttered filter is shuttered when the first video feed image is displayed, thereby providing only the first video feed image to a first viewer using said first shuttered filter and providing only the second video feed image to a second viewer using said second shuttered filter wherein:

the first shuttered filter is shuttered when the first shuttered filter is in a first orientation, and the first shuttered filter is not shuttered when the first shuttered filtered is in a second orientation, the first orientation being where the first shuttered filter is oriented towards the common display and the second orientation being where the second shuttered filter is oriented away from the common display and the second shuttered filter is shuttered when the second shuttered filter is in a third orientation, and the second shuttered filter is not shuttered when the second shuttered filtered is in a fourth orientation, the third orientation being where the second shuttered filter is oriented towards the common display and the fourth orientation being where the second shuttered filter is oriented away from the common display.

9. A system according to claim 8, further comprising:
a first audio unit coupled to said first shuttered filter and a second audio unit coupled to said second shuttered filter, and wherein said control unit is further operable to control said first audio unit to provide sounds associated with the first video feed to the first viewer and to control said second audio unit to provide sounds associated with the second video feed to the second viewer.

10. A system according to claim 8, wherein said first shuttered filter includes a first pair of LCD shutter glasses, and said second shuttered filter includes a second pair of LCD shutter glasses.

11. A system according to claim 10, further comprising: a first headphone unit coupled to said first set of LCD shutter glasses and a second headphone unit coupled to said second set of LCD shutter glasses, and wherein said control unit is further operable to control said first headphone unit to provide sounds associated with the first video feed to the first viewer and to control said second headphone unit to provide sounds associated with the second video feed to the second viewer.

12. A system according to claim 8, further comprising a third shuttered filter that includes a pair of LCD shutter glasses, wherein the first video feed is a signal providing the first viewer with a first player's perspective of a video game and the second video feed is a signal providing the second viewer with a second player's perspective of the video game, and said control unit is operable to synchronize said third shuttered filter to said display such that one of said pair of LCD shutter glasses is shuttered when the first video feed image is displayed and the other of said pair of LCD shutter glasses is shuttered when the second video feed image is displayed, thereby providing a combined perspective of the video game to a third viewer using said third shuttered filter.

13. A method of providing respective video feeds to at least two viewers using a common display, said method comprising:
controlling the common display to alternately display an image from a first video feed and an image from a second video feed;
synchronizing a first shuttered filter to the common display such that the first filter is shuttered when the second video feed image is displayed, thereby providing only the first video feed image to a first viewer using the first shuttered filter;
synchronizing a second shuttered filter to the common display such that the second filter is shuttered when the first video feed image is displayed, thereby providing only the second video feed image to a second viewer using the second shuttered filter;
determining whether the first shuttered filter is in a first orientation or a second orientation;
determining whether the second shuttered filter is in a third orientation or a fourth orientation;
shuttering the first shuttered filter when the first shuttered filter is in the first orientation, the first orientation being where the first shuttered filter is oriented towards the common display and the second orientation being where the second shuttered filter is oriented away from the common display; and
shuttering the second shuttered filter when the second shuttered filter is in the third orientation, the third orientation being where the second shuttered filter is oriented towards the common display and the fourth orientation being where the second shuttered filter is oriented away from the common display.

14. A method according to claim 13, wherein a first audio unit is coupled to the first shuttered filter and a second audio unit is coupled to the second shuttered filter, and said method further comprises:
providing sounds associated with the first video feed to the first viewer using the first audio unit, and providing sounds associated with the second video feed to the second viewer using the second audio unit.

15. A method according to claim 13, wherein the first video feed is a first television signal and the second video feed is a second television signal, whereby the first viewer is provided with programming carried by the first television signal and the second viewer is provided with programming carried by the second television signal.

16. A method according to claim 13, wherein the first video feed is a first video game signal and the second video feed is a second video game signal, whereby the first viewer is provided with a first video game and the second viewer is provided with a second video game.

17. A method according to claim 13, wherein the first video feed is a signal providing the first viewer with a first player's perspective of a video game and the second video feed is a signal providing the second viewer with a second player's perspective of the video game.

18. A method according to claim 14, further comprising:
synchronizing a pair of LCD shutter glasses to the common display such that one of the pair of LCD shutter glasses is shuttered when the second video feed image is displayed and the other of the pair of LCD shutter glasses is shuttered when the first video feed image is displayed, thereby providing a combined perspective of the video game to a third viewer using the pair of LCD shutter glasses.

19. A method according to claim 13, wherein the first video feed is a television signal and the second video feed is a video game signal, whereby the first viewer is provided with programming carried by the television signal and the second viewer is provided with a video game.

20. A video game apparatus connectable to a display, a first pair of LCD shutter glasses, and a second pair of LCD shutter glasses, said apparatus comprising:
a game unit operable to control the display to alternately display a full-screen image according to a first perspective of a video game and a full-screen image according to a second perspective of the video game, to synchronize the first pair of LCD shutter glasses to the display such that a first player using the first pair of LCD shutter glasses can play the video game while viewing the video game from the first perspective only, and to synchronize the second pair of LCD shutter glasses to the display such that a second player using the second pair of LCD shutter glasses can play the video game while viewing the video game from the second perspective only, wherein:

the first pair of LCD shutter glasses are shuttered when the first pair of LCD shutter glasses are in a first orientation, and the first pair of LCD shutter glasses are not shuttered when the first pair of LCD shutter glasses are in a second orientation, the first orientation being where the first pair of LCD shutter glasses are oriented towards the display and the second orientation being where the first pair of LCD shutter glasses are oriented away from the display; and the second pair of LCD shutter glasses are shuttered when the second pair of LCD shutter glasses are in a third orientation, and the second pair of LCD shutter glasses are not shuttered when the second pair of LCD shutter glasses are in a fourth orientation, the third orientation being where the second pair of LCD shutter glasses are oriented towards the display and the fourth orientation being where the second pair of LCD shutter glasses are oriented away from the display.

21. An apparatus according to claim 20, wherein said control unit is further operable to control a first audio unit coupled to the first pair of LCD shutter glasses to provide sounds associated with the first perspective of the video game to the first player and to control a second audio unit coupled to the second pair of LCD shutter glasses to provide sounds associated with the second perspective of the video game to the second player.

22. An apparatus according to claim 20, wherein said control unit is operable to alternately display the first perspective of the video game and the second perspective of the video game by interlacing an image from the first perspective of the video game with an image from the second perspective of the video game, whereby lines of the first perspective image are interleaved with lines of the second perspective image.

23. A video game system, comprising:
a game unit;
a display connected to said control unit;
a first pair of LCD shutter glasses connected to said control unit; and
a second pair of LCD shutter glasses connected to said control unit;
said game unit being operable to control said display to alternately display a full-screen image according to a first perspective of a video game and a full-screen image according to a second perspective of the video game, to synchronize said first pair of LCD shutter glasses to the display such that a first player using the first pair of LCD shutter glasses can play the video game while viewing the video game from the first perspective only, and to synchronize said second pair of LCD shutter glasses to the display such that a second player using the second pair of LCD shutter glasses can play the video game while viewing the video game from the second perspective only, wherein:

the first pair of LCD shutter glasses are shuttered when the first pair of LCD shutter glasses are in a first orientation, and the first pair of LCD shutter glasses are not shuttered when the first pair of LCD shutter glasses are in a second orientation, the first orientation being where the first pair of LCD shutter glasses are oriented towards the display and the second orientation being where the first pair of LCD shutter glasses are oriented away from the display; and the second pair of LCD shutter glasses are shuttered when the second pair of LCD shutter glasses are in a third orientation, and the second pair of LCD shutter glasses are not shuttered when the second pair of LCD shutter glasses are in a fourth orientation, the third orientation being where the second pair of LCD shutter glasses are oriented towards the display and the fourth orientation being where the second pair of LCD shutter glasses are oriented away from the display.

24. A system according to claim 23, further comprising:
a first headphone unit coupled to said first set of LCD shutter glasses and a second headphone unit coupled to said second set of LCD shutter glasses, and wherein said control unit is further operable to control said first headphone unit to provide sounds associated with the first perspective of the video game to the first viewer and to control said second headphone unit to provide sounds associated with the second perspective of the video game to the second viewer.

25. A system according to claim 23, further comprising a third pair of LCD shutter glasses, and said control unit is operable to synchronize said third pair of LCD shutter glasses to said display such that one of said pair of LCD shutter glasses is shuttered when an image from the first perspective of the video game is displayed and the other of said pair of LCD shutter glasses is shuttered when an image from the second perspective of the video game is displayed, thereby providing a combined perspective of the video game to a third viewer using said third pair of LCD shutter glasses.

26. A method of providing a video game to at least two players using a common display, said method comprising:
controlling the common display to alternately display a full-screen image according to a first perspective of a video game and a full-screen image according to a second perspective of the video game;
synchronizing a first pair of LCD shutter glasses to the common display such that a first player using the first pair of LCD shutter glasses can play the video game while viewing the video game from the first perspective only;
synchronizing a second pair of LCD shutter glasses to the common display such that a second player using the second pair of LCD shutter glasses can play the video game while viewing the video game from the second perspective only;
determining whether the first pair of LCD shutter glasses are in a first orientation or a second orientation;
determining whether the second pair of LCD shutter glasses are in a third orientation or a fourth orientation;
shuttering the first pair of LCD shutter glasses when the first pair of LCD shutter glasses are in the first orientation, the first orientation being where the first pair of LCD shutter glasses are oriented towards the common display and the second orientation being where the first pair of LCD shutter glasses are oriented away from the common display; and
shuttering the second pair of LCD shutter glasses when the second pair of LCD shutter glasses are in the third orientation, the third orientation being where the second pair of LCD shutter glasses are oriented towards the common display and the fourth orientation being where the second pair of LCD shutter glasses are oriented away from the common display.

27. A method according to claim 26, wherein a first audio unit is coupled to the first pair of LCD shutter glasses and a second audio unit is coupled to the second pair of LCD shutter glasses, and said method further comprises:

providing sounds associated with the first perspective of the video game to the first viewer using the first audio unit, and providing sounds associated with the second perspective of the video game to the second viewer using the second audio unit.

28. A method according to claim 26, further comprising:
synchronizing a third pair of LCD shutter glasses to the common display such that one of the third pair of LCD shutter glasses is shuttered when the second perspective of the video game is displayed and the other of the third pair of LCD shutter glasses is shuttered when the first perspective of the video game is displayed, thereby providing a combined perspective of the video game to a third viewer using the third pair of LCD shutter glasses.

29. A method of providing a video game to a first viewer while providing a video program to a second viewer, the first viewer and the second viewer using a common display, said method comprising:

controlling the common display to alternately display an image from the video game and an image from the video program;

synchronizing a first pair of LCD shutter glasses to the common display such that a first viewer using the first pair of LCD shutter glasses can play the video game only; and synchronizing a second pair of LCD shutter glasses to the common display such that a second viewer using the second pair of LCD shutter glasses can view the video program only;

determining whether the first pair of LCD shutter glasses are in a first orientation or a second orientation;

determining whether the second pair of LCD shutter glasses are in a third orientation or a fourth orientation;

shuttering the first pair of LCD shutter glasses when the first pair of LCD shutter glasses are in the first orientation, the first orientation being where the first pair of LCD shutter glasses are oriented towards the common display and the second orientation being where the first pair of LCD shutter glasses are oriented away from the common display; and shuttering the second pair of LCD shutter glasses when the second pair of LCD shutter glasses are in the third orientation, the third orientation being where the second pair of LCD shutter glasses are oriented towards the common display and the fourth orientation being where the second pair of LCD shutter glasses are oriented away from the common display.

30. A method according to claim 29, wherein a first audio unit is coupled to the first pair of LCD shutter glasses and a second audio unit is coupled to the second pair of LCD shutter glasses, and said method further comprises:

providing sounds associated with the video game to the first viewer using the first audio unit, and providing sounds associated with the video to the second viewer using the second audio unit.

31. The apparatus of claim 1, wherein:
the first shuttered filter comprises a first photodetector and the second shuttered filter comprises a second photodetector;
the first photodetector is used to determine whether the first shuttered filter is in the first orientation or the second orientation; and,
the second photodetector is used to determine whether the second shuttered filter is in the third orientation or the fourth orientation.

32. The apparatus of claim 31, wherein a first light intensity value is obtained by the first photodetector and a drop in the first light intensity value indicates that the first shuttered filter is in the second orientation; and
a second light intensity value is obtained by the second photodetector and a drop in the second light intensity value indicates that the second shuttered filter is in the fourth orientation.

33. The system of claim 8, wherein:
the first shuttered filter comprises a first photodetector and the second shuttered filter comprises a second photodetector;
the first photodetector is used to determine whether the first shuttered filter is in the first orientation or the second orientation; and,
the second photodetector is used to determine whether the second shuttered filter is in the third orientation or the fourth orientation.

34. The system of claim 33, wherein:
a first light intensity value is obtained by the first photodetector and a drop in the first light intensity value indicates that the first shuttered filter is in the second orientation; and
a second light intensity value is obtained by the second photodetector and a drop in the second light intensity value indicates that the second shuttered filter is in the fourth orientation.

35. The method of claim 13, wherein:
determining whether the first shuttered filter is in the first orientation or the second orientation comprises determining with a first photodetector whether the first shuttered filter is in the first orientation or the second orientation; and
determining whether the second shuttered filter is in the third orientation or the fourth orientation comprises determining with a second photodetector whether the second shuttered filter is in the third orientation or the fourth orientation.

36. The method of claim 35, wherein:
a first light intensity value is obtained by the first photodetector and a drop in the first light intensity value indicates that the first shuttered filter is in the second orientation; and
a second light intensity value is obtained by the second photodetector and a drop in the second light intensity value indicates that the second shuttered filter is in the fourth orientation.

37. The apparatus of claim 20, wherein:
the first pair of LCD shutter glasses comprise a first photodetector and the second pair of LCD shutter glasses comprise a second photodetector;
the first photodetector is used to determine whether the first pair of LCD shutter glasses are in the first orientation or the second orientation; and,
the second photodetector is used to determine whether the second pair of LCD shutter glasses are in the third orientation or the fourth orientation.

38. The apparatus of claim 37, wherein a first light intensity value is obtained by the first photodetector and a drop in the first light intensity value indicates that the first pair of LCD shutter glasses are in the second orientation; and
a second light intensity value is obtained by the second photodetector and a drop in the second light intensity value indicates that the second pair of LCD shutter glasses are in the fourth orientation.

39. The system of claim 23, wherein:
  the first pair of LCD shutter glasses comprise a first photodetector and the second pair of LCD shutter glasses comprise a second photodetector;
  the first photodetector is used to determine whether the first pair of LCD shutter glasses are in the first orientation or the second orientation; and,
  the second photodetector is used to determine whether the second pair of LCD shutter glasses are in the third orientation or the fourth orientation.

40. The system of claim 39, wherein a first light intensity value is obtained by the first photodetector and a drop in the first light intensity value indicates that the first pair of LCD shutter glasses are in the second orientation; and
  a second light intensity value is obtained by the second photodetector and a drop in the second light intensity value indicates that the second pair of LCD shutter glasses are in the fourth orientation.

41. The method of claim 26, wherein:
  determining whether the first pair of LCD shutter glasses are in the first orientation or the second orientation comprises determining with a first photodetector whether the first pair of LCD shutter glasses are in the first orientation or the second orientation; and
  determining whether the second pair of LCD shutter glasses are in the third orientation or the fourth orientation comprises determining with a second photodetector whether the second pair of LCD shutter glasses are in the third orientation or the fourth orientation.

42. The method of claim 41, wherein:
  a first light intensity value is obtained by the first photodetector and a drop in the first light intensity value indicates that the first pair of LCD shutter glasses are in the second orientation; and
  a second light intensity value is obtained by the second photodetector and a drop in the second light intensity value indicates that the second pair of LCD shutter glasses are in the fourth orientation.

43. The method of claim 29, wherein:
  determining whether the first pair of LCD shutter glasses are in the first orientation or the second orientation comprises determining with a first photodetector whether the first pair of LCD shutter glasses are in the first orientation or the second orientation; and
  determining whether the second pair of LCD shutter glasses are in the third orientation or the fourth orientation comprises determining with a second photodetector whether the second pair of LCD shutter glasses are in the third orientation or the fourth orientation.

44. The method of claim 43, wherein:
  a first light intensity value is obtained by the first photodetector and a drop in the first light intensity value indicates that the first pair of LCD shutter glasses are in the second orientation; and
  a second light intensity value is obtained by the second photodetector and a drop in the second light intensity value indicates that the second pair of LCD shutter glasses are in the fourth orientation.

* * * * *

UNITED STATES PATENT AND TRADEMARK OFFICE
CERTIFICATE OF CORRECTION

Page 1 of 1

PATENT NO. : 8,466,954 B2
APPLICATION NO. : 11/732830
DATED : June 18, 2013
INVENTOR(S) : Heinrich Shih Ko et al.

It is certified that error appears in the above-identified patent and that said Letters Patent is hereby corrected as shown below:

In the Specification
Column 5, line 38, "to to" should read --to the--
Column 6, line 1, "A" should read --a--
Column 6, line 36, "illustrate" should read --illustrates--
Column 8, line 18, "ach" should read --each--
Column 8, line 19, "that" should read --than--

In the Claims
Column 11, line 4, "filtered" should read --filter--
Column 11, line 12, "filtered" should read --filter--

Signed and Sealed this
Fourth Day of August, 2015

Michelle K. Lee
*Director of the United States Patent and Trademark Office*